United States Patent [19]
Uematsu

[11] Patent Number: 5,892,551
[45] Date of Patent: Apr. 6, 1999

[54] CIRCUIT AND METHOD FOR REDUCING FLICKER

[75] Inventor: Takeshi Uematsu, Tokyo, Japan

[73] Assignee: NEC Corporation, Tokyo, Japan

[21] Appl. No.: 954,941

[22] Filed: Oct. 22, 1997

[30] Foreign Application Priority Data

Oct. 23, 1996 [JP] Japan ................................. 8-280630

[51] Int. Cl.$^6$ ...................................................... H04N 7/01
[52] U.S. Cl. ............................................ 348/447; 348/910
[58] Field of Search .................................... 348/447, 456, 348/443, 444, 445, 446, 910; H04N 7/01

[56] References Cited

U.S. PATENT DOCUMENTS

| | | | |
|---|---|---|---|
| 5,227,879 | 7/1993 | Morita et al. | 358/141 |
| 5,510,843 | 4/1996 | Keene et al. | 348/446 |
| 5,708,480 | 1/1998 | Bromba et al. | 348/447 X |

FOREIGN PATENT DOCUMENTS

| | | |
|---|---|---|
| 61-125294 | 6/1986 | Japan . |
| 63-199594 | 8/1988 | Japan . |
| 3-220990 | 9/1991 | Japan . |
| 6-292152 | 10/1994 | Japan . |

Primary Examiner—Nathan Flynn
Attorney, Agent, or Firm—Foley & Lardner

[57] ABSTRACT

A flicker reducing circuit that can prevent a degradation of an image by performing an outline blur correction together with a flicker reduction. In the flicker reducing circuit, a vertical contour detecting circuit detects an outline of the vertical component of a horizontal straight line. A switch selects an addition signal from the vertical low-pass filter for a period during which it is judged that an outline corresponds to the vertical component of a horizontal straight line according to the detection signal. The addition signal is obtained by adding the low-frequency component of a spatial frequency in a vertical direction to an output signal from the differentiating circuit. During other periods, the switch selects a delay display signal not subjected to a filtering process, output from the delaying circuit. Thus, a display signal processed for flicker reduction and blur correction can be output only to a flicker noticeable area such as one horizontal line in graphic data, in addition to character displaying positions.

7 Claims, 10 Drawing Sheets

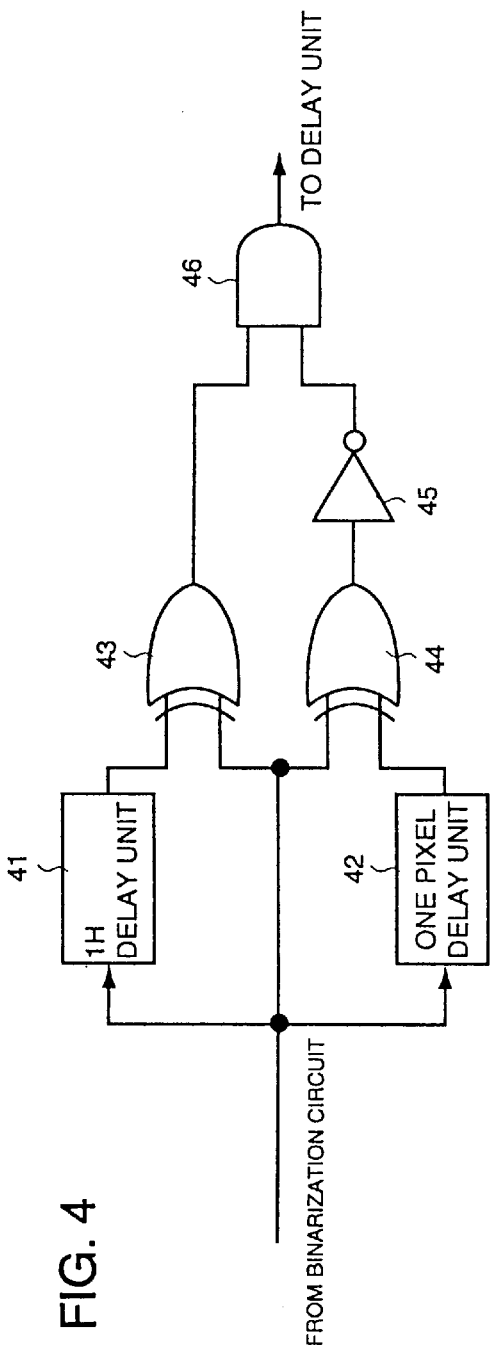
FIG. 4
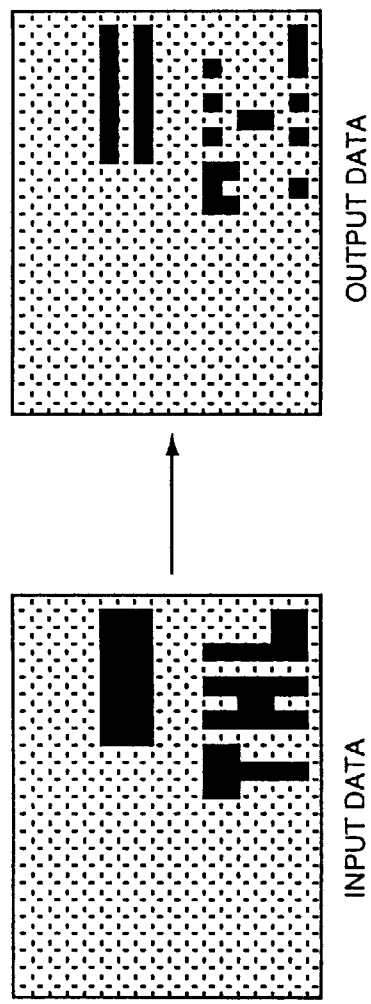
FIG. 5(A) INPUT DATA
FIG. 5(B) OUTPUT DATA

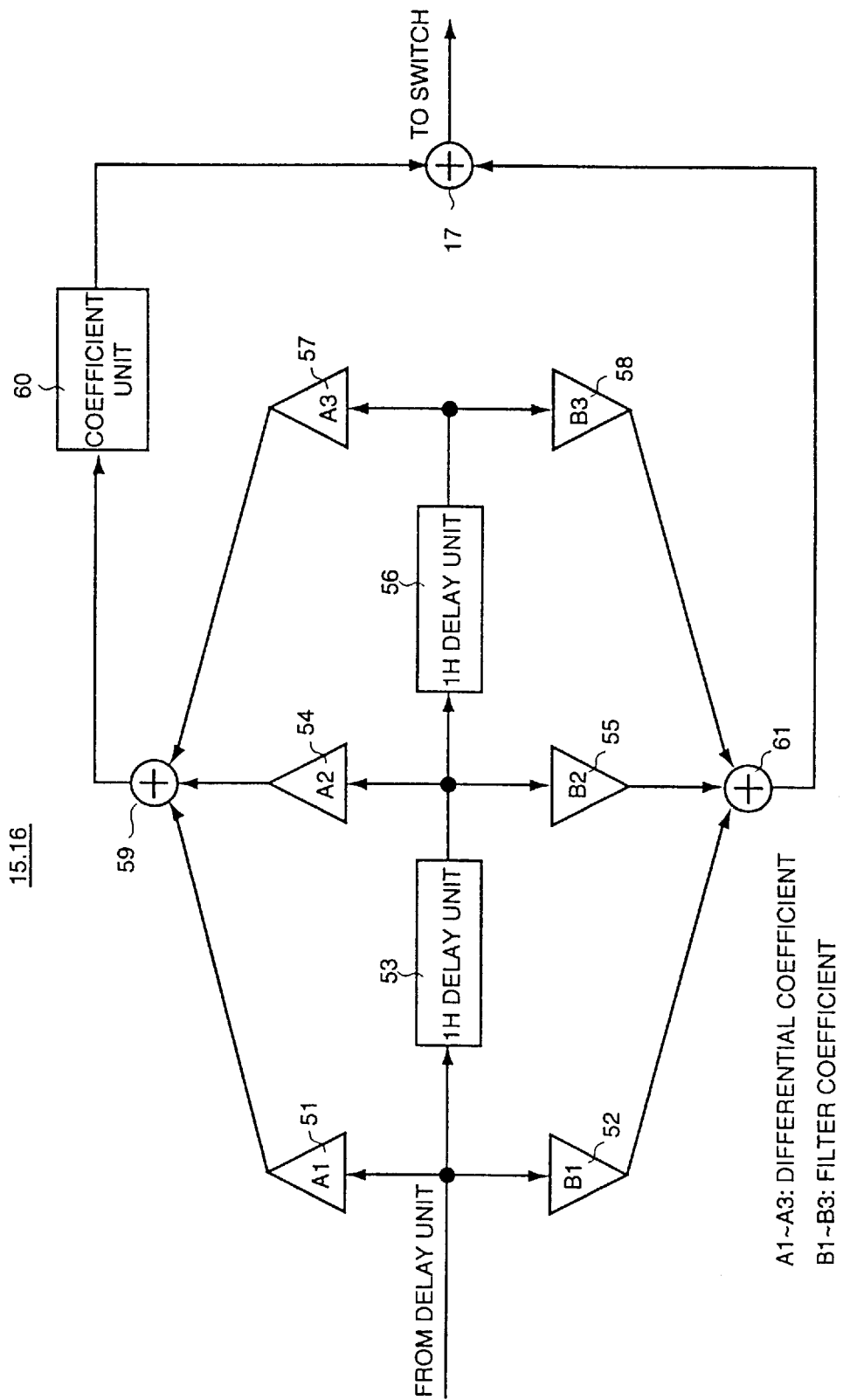

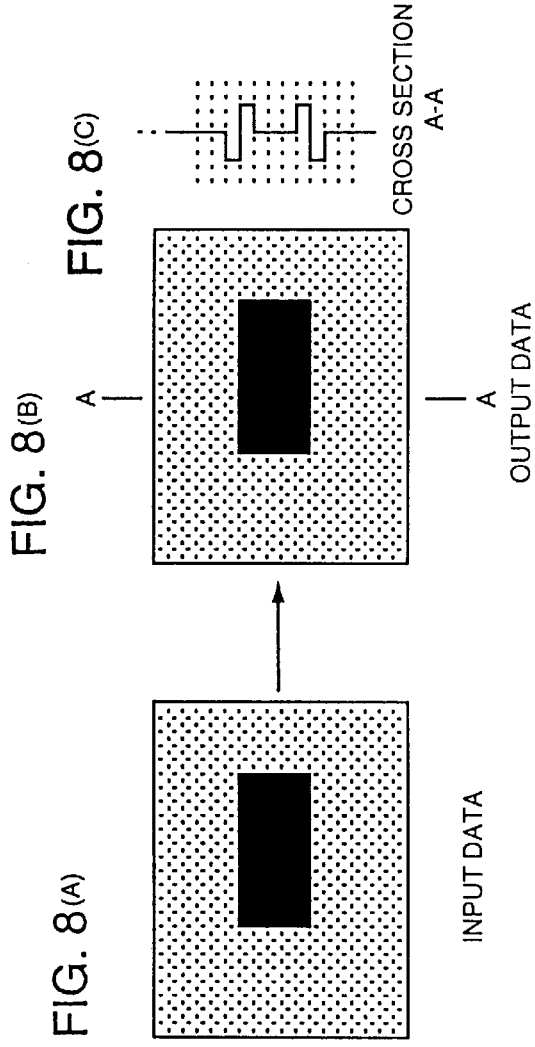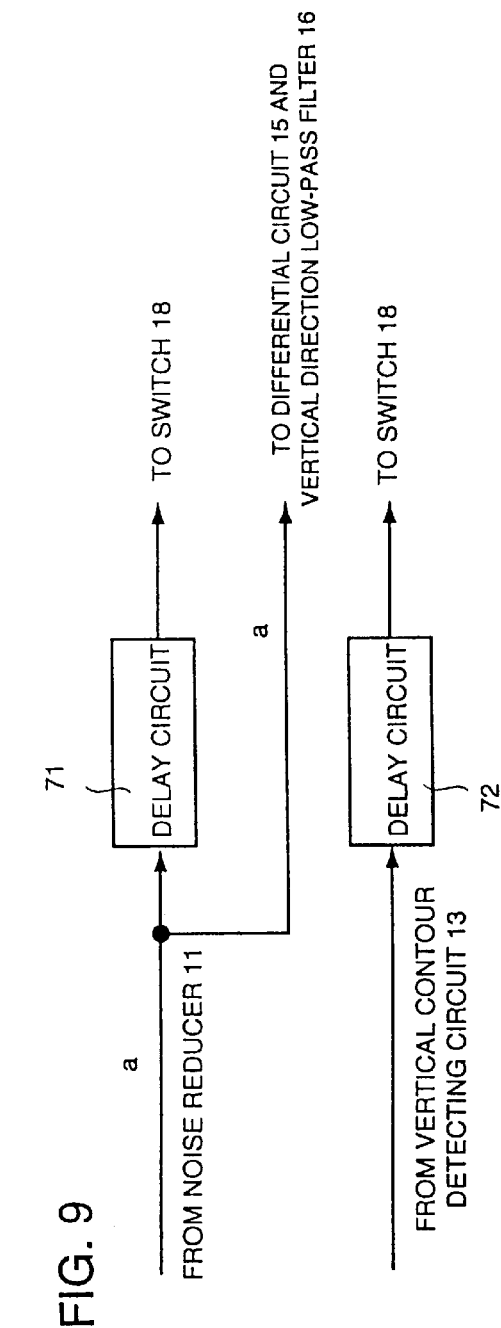

CIRCUIT AND METHOD FOR REDUCING FLICKER

BACKGROUND OF THE INVENTION

The present invention relates to a flicker reducing circuit, and more particularly to a flicker reducing circuit in a terminal that displays character data, image data, and the like on a display unit. The present invention also relates to a flicker reducing method.

FIG. 13 is a block diagram illustrating a terminal having a conventional flicker reducing circuit. This terminal consists of a data processing unit 80, an interactive unit 81, a line control unit 82, a display processing unit 83, a vertical low-pass filter 84, delay units 85 and 86, an exchange switch 87, a memory unit 88, an interlace converting unit 89, an NTSC encoder 90, and a display unit 91. The data processing unit 83 is connected to the interactive unit 81, the line control unit 82, and the display processing unit 83 via a bus 93. The data processing unit 81 outputs character data and graphic data, or character data and composite data in which character data is combined with graphic data, input to the interactive unit 81.

The interactive unit 81 receives character data and graphic data in an interactive mode. The line control unit 82 controls a connection between a telephone line 92 and the bus 93 to which the data processing unit 80, the interactive unit 81 and the display processing unit 83 are connected. The display processing unit 83 stores character data and composite data output from the data processing unit 80 to the memory unit 88 and reads character data and composite data out of the memory unit 88 to display them. The vertical low-pass filter 84 passes low-frequency components among spatial frequencies in vertical direction of a screen of composite data processed in the display processing unit 83.

The delay unit 85 delays composite data processed in the display processing unit 83 by a process time in the vertical low-pass filter 84 and then outputs the result. The delay unit 86 receives character image data formed of only character data among data processed in the display processing unit 83 and delays it by a process time in the vertical low-pass filter 84, then outputting the result. The changeover switch 87 selects the output data from the vertical low-pass filter 84 or the output data from the delay unit 85 according to the output signal from the delay unit 86.

The interlace converter 89 converts composite data selectively output from the changeover switch 87 into data to be displayed in an interlace mode. The NTSC encoder 90 converts the composite data converted in the interlace converter 89 into a composite signal conformed to the NTSC system. The display unit 91 displays the composite data in a composite signal mode extracted by the NTSC encoder 90.

Next, the operation of the conventional flicker reducing circuit will be explained below. First, the interactive unit 81 input character data and graphic data encoded in a predetermined encoding system to the data processing unit 80 via the line control unit 82. The data processing unit 80 creates composite data by combining the character data with the graphic data input from the interactive unit 81, and then inputs the composite data to the display processing unit 83, together with the character data.

The character data and the composite data input to the display processing unit 83 is stored into the memory unit 88. The memory unit 88 includes a composite image line memory for storing the composite data and a character image line memory for storing character data. The composite data is stored into or read from the composite image line memory while the character data is stored into or read from the character image line memory.

The display processing unit 83 reads out the composite data stored in the composite image line memory within the memory unit 88, and then outputs it as image data for a non-interlace operation which sequentially scan a screen from its upper portion toward its lower portion, to the vertical low-pass filter 84 and the delay unit 85. The character data stored in the character line memory within the memory unit 88 is input to the delay unit 86. The vertical low-pass filter 84 is a filter which passes low-frequency components of less than a predetermined frequency of spatial frequency components in the vertical direction on an image.

Regarding the character data, the data processing unit 80 detects a character displaying position at the time a character frame has been received, and then combines the character information frame showing the position as a set of dots. That is, character data output from the display processing unit 83 to the delay unit 86 becomes image data representing the presence or absence of a flag.

The composite data input to the delay unit 85 and the character data input to the delay unit 86 are delayed by the process time of the vertical low-pass filter 84. The character data output from the delay unit 86 is supplied as a switching signal to the changeover switch 87. Thus, the changeover switch 87 selects the low-frequency component of the composite data passing through the vertical low-pass filter 84 for a period during which a flag "1" is set to the character data output from the delay unit 86 (during a period for a character display position). The delay unit 85 also selects output composite data for a period during which the flag "1" is not set.

That is, the changeover switch 87 selects the low-frequency component of composite data passing through the vertical low-pass filter 84 at a character display position and selects the output composite data from the delay unit 85 which do not pass through the vertical low-pass filter 84 at positions other than character display positions.

The composite data selected by the changeover switch 87 is image data displayed in a non-interlace display system. However, since the method of displaying composite data on the display screen of the display unit 91 is a 2:1 interlace displaying system in which a first field and a second filed are alternately scanned, the interlace converter 89 converts composite data into data in the 1:2 interlace display system.

The NTSC encoder 90 receives the composite data output from the interlace converter 89. In the NTSC encoder 89, a color signal of the composite data is balanced-modulated. The composite data is converted into an NTSC system composed composite signal band-shared and duplexed in the high-frequency area of a brightness signal. The converted signal is input to the display unit 91. Thereafter, the display unit 91 color-displays the composite data from the NTSC encoder 90 converted into a composite signal on the screen.

In the display unit 91 which displays in the 2:1 interlace displaying system, since each scanning line is refreshed every frame period (e.g. 30 seconds), as well known, flickering occurs at each bright spot on a scanning line. In actual, neighboring scanning lines are overlapped each other. In the NTSC television system, two neighboring scanning lines are set to have such a frequency relation that when the brightness of a scanning line in one field is minimized, the brightness of a scanning line in the other field is maximized. Hence, the brightness of the two scanning lines is interpolated so that flickering does not occur clearly.

When an image is formed of one horizontal line, bright spots appear only on one scanning line, but there are no bright spots on the neighboring scanning lines. In this case, occurrence of flicker is conspicuous. Particularly, one horizontal line is seen in many characters. In many case, characters are not interrelated with neighboring scanning lines. Hence, occurrence of flickers is conspicuous in characters.

In the flicker reducing circuit of the terminal shown in FIG. 13, in order to display character data and graphic data in a superimposition mode, data passing the vertical low-pass filter 84 are selected in character data area while data output from the display processing unit 83 being input data of the vertical low-pass filter 84 are selected in areas other than character data area. Thus, images are displayed at positions other than character positions without removing high-frequency components of a spatial frequency in a vertical direction. Flicker is removed by removing high-frequency components of a spatial frequency in a vertical direction in a character image at a character position.

The conventional flicker reducing circuit reduces only the flicker of the character image at a character position. However, this flick phenomenon occurs at positions other than character display positions. When the noticeable flicker occurring at a character display position is reduced, a flicker becomes unexpectedly prominent even at graphic data display positions where flicker is not conspicuous. For that reason, in order to reduce the flicker, it is needed to detect not only character display positions but also one horizontal line displayed with graphic data. In this case, it is required to execute a low-pass filtering to a narrow band because a flicker of one horizontal line in graphic data image and the like is not noticeable compared with that at a character display position.

Conspicuous flicker can be removed at character display positions. However, if an ideal low-pass filter (never obtainable in actual) is not used that cuts only frequency components of a predetermined frequency or more, blurring occurs on the boundary portion. In actual, correction is needed to add the originally-included signal component removed by the low-pass filter.

SUMMARY OF THE INVENTION

The objective of the present invention is to solve the above-mentioned tasks.

Moreover, the objective of the invention is to provide a flicker reducing circuit that reduces flicker to minimize a degradation of an image, by detecting horizontal straight lines on a display screen regardless of character display positions, performing strongly (broadly) a low-pass filtering operation in a vertical direction in an area such characters with less motion between a previous frame and the following frame, and performing weakly (narrowly) a low-pass filtering operation in a vertical direction in horizontal straight lines in graphic data with large motion.

Furthermore, another objective of the present invention is to provide a flicker reducing circuit that can prevent a degradation of an image by performing an outline blur correction together with a flicker reduction, wherein a blurred outline is corrected in a vertical low-pass filtering operation by differentiating strongly (broadly) the outline of a blurred horizontal straight line in an area such as a character with less motion between a previous frame and the following frame and by differentiating weakly (narrowly) the horizontal straight line in graphic data with large motion.

Further another objective of the present invention is to provide a flicker reducing circuit that can reduce flicker for general purpose use.

Still another objective of the present invention is to provide a flicker reducing method that reduces flicker to minimize a degradation of an image.

The objective of the present invention is achieved by the flicker reducing circuit comprising a noise reducer for reducing noises included in a display signal by detecting motion between a previous frame and the following frame, and for outputting a motion detection signal, a binarization circuit for dynamically varying its threshold value based on the motion detection signal output from the noise reducer and then digitizing and outputting an output display signal from the noise reducer, a vertical contour detecting circuit for detecting an outline of the vertical component of a horizontal straight line from an output digital signal of the binarization circuit, and outputting the outline as flag data, filter means for passing a low-frequency component of a spatial frequency in a vertical direction on an screen of the output display signal output from the noise reducer, and outputting a signal obtained by adding the display signal to a signal component to be originally included, a delay unit for delaying a display signal output from the noise reducer by a process time of the filter means and delaying the flag data output from the vertical contour detecting circuit by the process time, and then outputting the display signal and the flag data, and a switch for selecting the output signal from the filter means for a period during which it is judged that an outline corresponds to a vertical component of a horizontal straight line according to the flag data from the delay unit and selecting the delay display signal output from the delay unit for a period during which it is judged that an outline does not correspond to a vertical component of a horizontal straight line according to the flag data from the delay unit.

The noise reducer separates an area into plural steps according to a motion rate of the input display signal between the previous frame and the following frame, multiplies a differential signal between the previous frame and the following frame by a coefficient which is set to a larger value to a slower moving area, and outputting a signal obtained by subtracting the multiplication result from the input display signal.

According to the present invention, the binarization circuit receives as input signals the output display signal and the motion detection signal output from the noise reducer, and dynamically varies the threshold value so as to set a slower moving area to a smaller value, according to the motion detection signal, and compares the display signal with the threshold value, and then digitizes and outputs the compared result.

According to the present invention, the vertical contour detecting circuit comprises a first detecting circuit for detecting an outline in a vertical direction from the digital signal of the binary circuit, a second detecting circuit for detecting a horizontal straight line, and a logical circuit for performing a logical product of the output detection signal from the first detecting circuit and the output detection signal from the second detecting circuit and then outputting a detection signal corresponding to an outline portion of a vertical component in a vertical direction of the horizontal straight line.

According to the present invention, the filter means comprises a differentiating circuit for detecting an edge in a vertical direction by performing one-directional differential operation in a vertical direction and multiplying the result by a coefficient, thus outputting the product, a transversal vertical low-pass filter with at least three taps for passing a low-frequency component of less than a predetermined frequency among spatial frequency components in a vertical direction on a screen of the display signal, and an adder for adding an output signal of the differentiating circuit to an output signal of the vertical low-pass filter, and then outputting the sum.

Furthermore, according to the present invention, the input display signal is a component signal, and the output signal of the switch is converted into a composite image signal conformed to a desired standard system image signal in an interlace display system.

According to the present invention, a flicker reducing method comprising the steps of reducing noises included in a display signal by detecting motion between a previous frame and the following frame, and outputting a motion detection signal, dynamically varying its threshold value based on the motion detection signal output and then digitizing and outputting an output display signal, detecting an outline of the vertical component of a horizontal straight line from an output digital signal and outputting the outline as flag data, passing a low-frequency component of a spatial frequency in a vertical direction on an screen of the output display signal, and outputting a signal obtained by adding the display signal to a signal component to be originally included, delaying an output display signal by a process time and delaying the flag data by the process time, and then outputting the output display signal and the output flag data, and selecting an output signal for a period during which it is judged that an outline corresponds to a vertical component of a horizontal straight line according to the flag data and selecting the delay display signal for a period during which it is judged that an outline does not correspond to a vertical component of a horizontal straight line according to the flag data.

According to the present invention, the filter means passes low-frequency components of a spatial frequency in a vertical direction on a screen to an output display signal from a noise reducer to reduce a flicker of a horizontal straight line and to output a signal to which an original signal component is added. Thus, a blur can be corrected by removing high-frequency components of a spatial frequency in an image vertical direction.

According to the present invention, the vertical contour detecting circuit detects an outline of the vertical component of a horizontal straight line and controls the switch according to the flag data. An output signal from the filter means is selected for a period during which it is judged that the outline corresponds to the vertical component of a horizontal straight line. A delay display signal output from the delay unit is selected for a period during which it is judged that the outline does not correspond to the vertical component of a horizontal straight line. As a result, the filter means can output a display signal processed for flicker reduction and blur corrects, only to a flicker noticeable area.

Furthermore, according to the present invention, the vertical contour detecting circuit detects an outline of the vertical component of a horizontal straight line by a digital signal obtained by dynamically varying the threshold value of the binarization circuit with the motion detection signal. In such an operation, to select a signal from the filter means over a wide area, many flags are set in a flicker conspicuous area in a horizontal straight line, for example, a motionless area such as a character between a previous frame and the following frame. Many flags are not set to select a signal passing through the filter means over a relatively narrow range in an area in which flicker is not so conspicuous, for example, for a slow motion area such as a horizontal straight line in graphic data image or nature image between a previous frame and the following frame.

BRIEF DESCRIPTION OF THE DRAWINGS

This and other objects, features and advantages of the present invention will become more apparent upon a reading of the following detailed description and drawings, in which:

FIG. 3(A) to FIG. 3 (D) are diagrams illustrating an input image and an output image to explain the operation of the noise reducer in FIG. 2;

FIG. 4 is a diagram showing an example of the vertical contour detecting circuit shown in FIG. 1;

FIG. 5(A) and FIG. 5(B) are diagrams illustrating an input image and an output image to explain the operation of the horizontal straight line and vertical contour detecting circuit shown in FIG. 4;

FIG. 6 is a block diagram showing an example of a combination of the differentiating circuit and the vertical low-pass filter in FIG. 1;

FIG. 8(A) to FIG. 8(C) are diagrams illustrating an input data image and an output data image of the differentiating circuit shown in FIG. 1;

FIG. 9 is a block diagram illustrating the delay unit in FIG. 1;

DESCRIPTION OF THE EMBODIMENTS

Next, an embodiment of the present invention will be described below with reference to the attached drawings.

Figure 1:
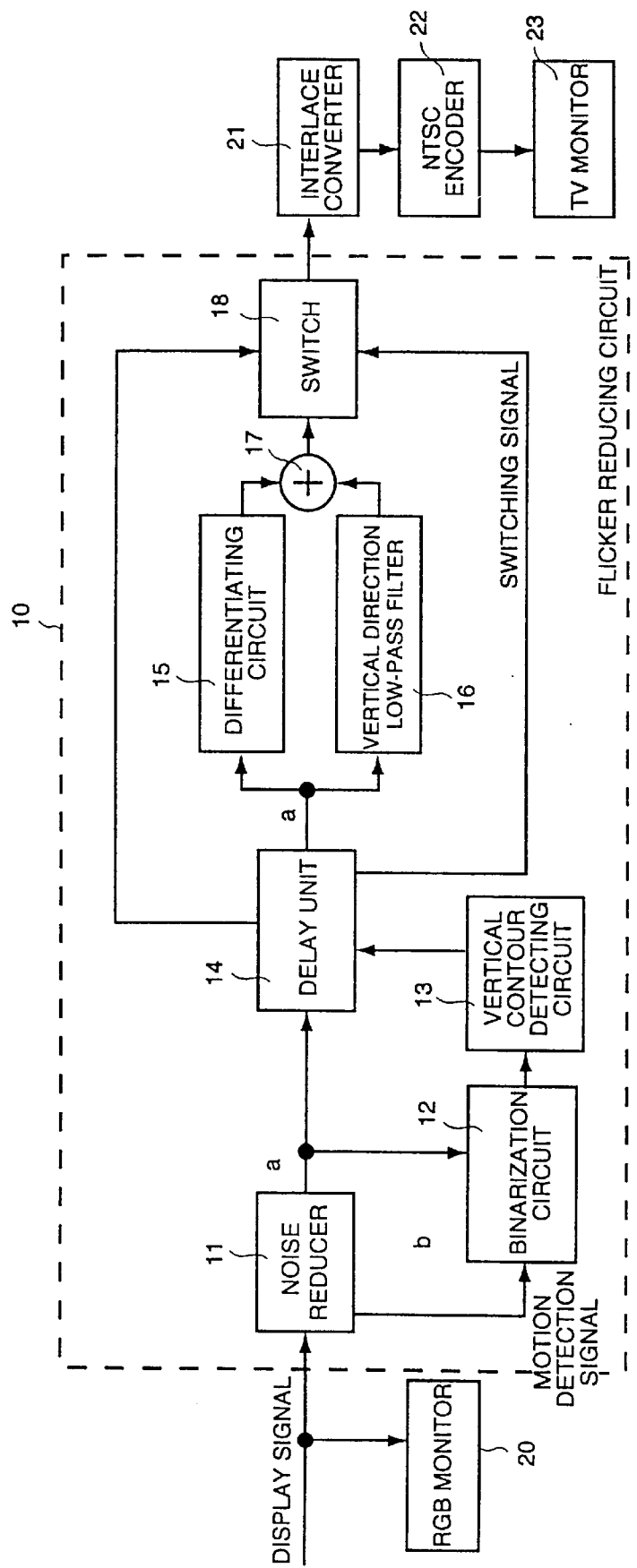
FIG. 1 is a block diagram showing a flicker reducing circuit according to an embodiment of the present invention.

FIG. 1 is a block diagram showing a flicker reducing circuit applied to a terminal, according to an embodiment of the present invention. Referring to FIG. 1, the flicker reducing circuit 10 consists of a noise reducer 11, a binarization circuit 12, a vertical contour detecting circuit 13, a delay unit 14, a differentiating circuit 15, a vertical low-pass filter 16, an adder 17, and a switch 18.

The noise reducer 11 outputs a display signal in which mosquito noises or the like contained in an input display signal are removed through motion detection between a previous frame and the following frame, and a motion detection signal in motion detection. The binarization circuit 12 digitizes a display signal output from the noise reducer 11 by dynamically varying its threshold value according to the motion detection signal similarly output. The vertical contour detecting circuit 13 detects an outline of the vertical component of a horizontal straight line from a digital signal output from the binarization circuit 12 and outputs it as flag data.

The delay unit 14 has a first route for outputting an output display signal from the noise reducer 11 to the differentiating circuit 15 and the vertical low-pass filter 16, a second route for delaying the output display signal from the noise reducer 11 by a longer process time among the process time of the differentiating circuit 15 and the process time of the vertical low-pass filter 16 and then outputting the delayed signal to the switch 18, and a third route for delaying output data from the vertical contour detecting circuit 13 by a longer process time among the process time of the differentiating circuit 15 and the process time of the vertical low-pass filter 16 and then outputting the delayed data to the switch 18.

The differentiating circuit 15 detects an outline of the vertical component of the horizontal straight line of an output display signal from the delay unit 14. The vertical low-pass filter 16 passes low-frequency components of a spatial frequency in a vertical direction on a screen of an output display signal of the delay unit 14. The adder 17 adds the output signal from the differentiating circuit 15 to the output signal from the vertical low-pas filter 16. Based on a flag input from the delay unit 14 via the third route, the switch 18 selects the output signal from the adder 17 as a display signal judged as the outline of a horizontal straight line and selects a display signal sent via the first route as a display signal not judged as the outline. The selected display signal is output as an output signal to the noise reducing circuit 10.

The RGB monitor 20 is disposed to the input of the flicker reducing circuit 10 and displays a display signal of the flicker reducing circuit 10. An interlace converter 21 for converting a display signal into data in a 2:1 interlace display system, an NTSC encoder 22 for converting an output signal from the interlace converter 18 into a composite video signal in the NTSC television system, and a TV monitor 23 for displaying a composite video signal from the NTSC encoder 22 are disposed on the output side of the flicker reducing circuit 10.

Next, the operation of the flicker reducing circuit with the above-mentioned configuration will be described below in detail. First, an input display signal, or a component signal, is supplied to the RGB monitor 20 to be displayed, and is input to the noise reducer 11 within the flicker reducing circuit 10.

The differentiating circuit 15 is very susceptible to noises such as mosquito noises and strengthens noises if it receives data with noises. Hence, the noise reducer 11 is arranged to remove noises from a video signal before the differentiating circuit 15 receives the image signal. The noise reducer 11, as shown with the block diagram in FIG. 2, has a frame cyclic configuration formed of subtracters 31 and 34, a motion detecting circuit 32, a coefficient unit 33, and a one frame delay unit 35.

In the noise reducer 11, the one frame delay unit 35 delays a display signal input via the subtracter 34 by one frame and then inputs the result to the subtracter 31. The subtracter 31 detects the difference between the delayed display signal and a current display signal. The motion detecting circuit 32 reads a motion based on the difference and then outputs a motion detection signal b. The coefficient unit 33 variably controls the coefficient to be multiplied by the difference. The coefficient is generally varied to be a relatively small value to a region with large motion and to be a relatively large value to a region with small motion.

The subtracter 34 subtracts (the difference×the coefficient) obtained in the coefficient unit 33 from the input display signal in a current frame to cancel and remove noises with large motion, and obtains a display signal a. Thus, the subtracter 34 outputs the display signal a to the one frame delay unit 35 and supplies to the binarization circuit 12 and the delay unit 14 shown in FIG. 1. The motion detecting circuit 32 supplies an output motion detection signal b to the binarization circuit 12.

Figure 2:
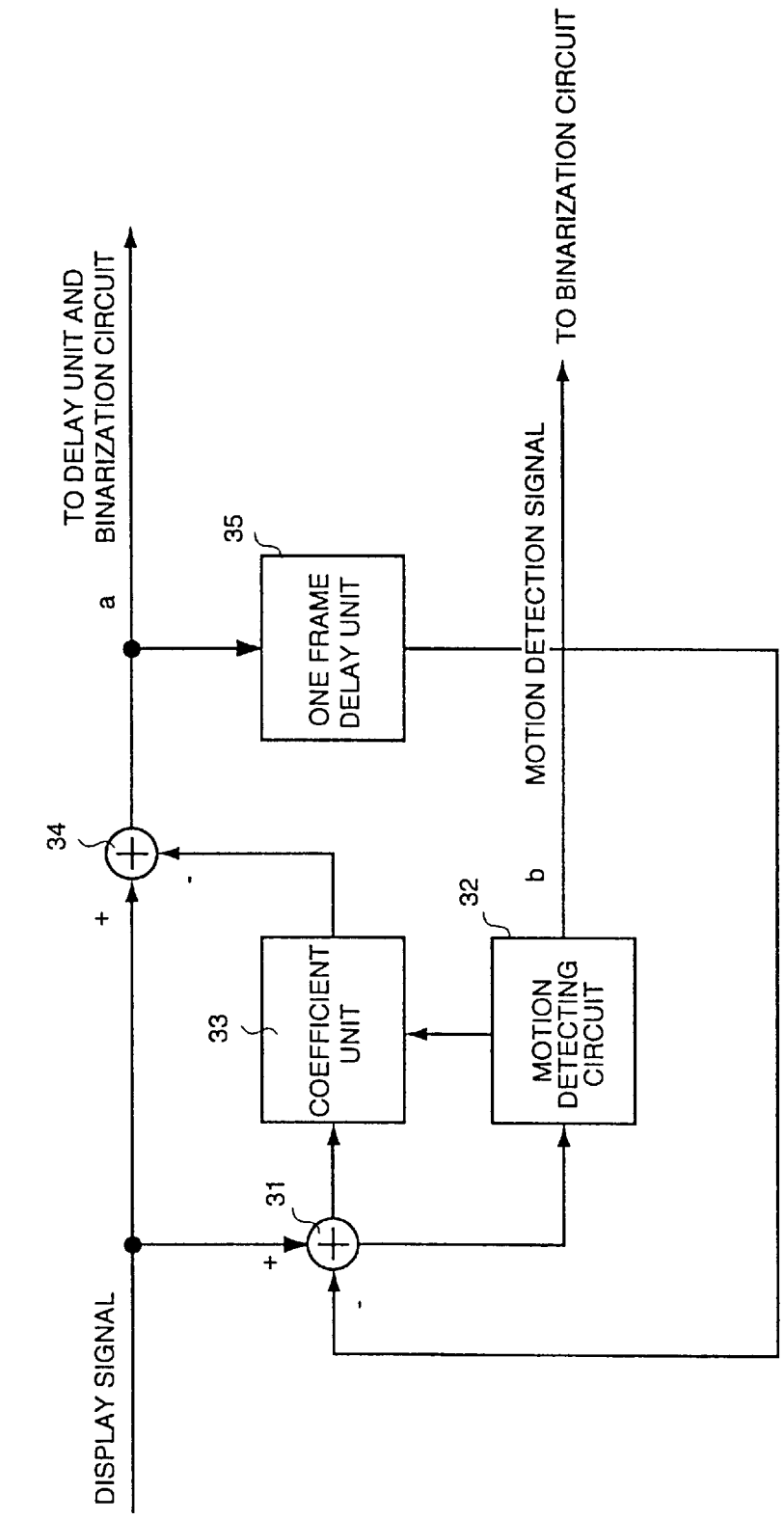
FIG. 2 is a block diagram showing an example of the noise reducer in FIG. 1.
Figure 3:
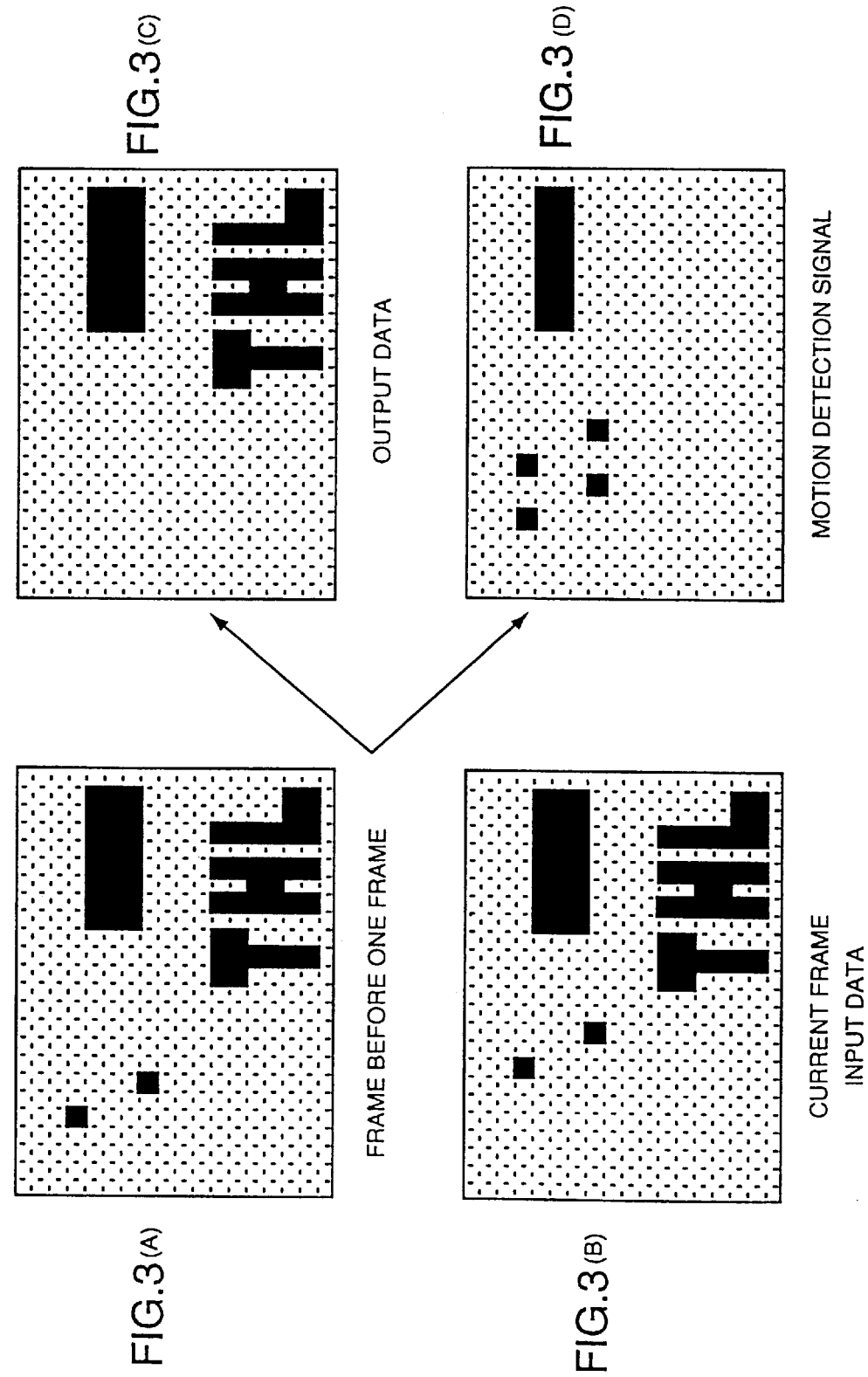

FIG. 3 is a diagram showing an example of an input display signal and an example of an output display signal in the noise reducer 11 shown in FIG. 2. In the image corresponding to an input display signal before one frame shown in FIG. 3(A) and the image corresponding to an input display signal after a current frame shown in FIG. 3(B), dots near the center of the screen represents noises. The horizontal lines in the upper right area shown in FIGS. 3(A) and 3(B) represent images with less motion. The horizontal line is shifted slightly downward between the previous frame and the current frame. The characters "THL" on the lower right side represent data superimposed to, for example, graphic data or the like and is a motionless image.

When such an input display signal is input to the noise reducer 11, the subtracter 34 outputs the display signal a in which are removed, like the data shown in FIG. 3(C). The motion detection signal b output from the noise reducer 11 is data as shown in FIG. 3(D).

Referring again to FIG. 1, when receiving as input signals the output display signal a and the motion detection signal b from the noise reducer 11, the binarization circuit 12 digitizes the display signal a by dynamically varying its threshold value according to the motion detection signal b, and thus outputs the resultant signal to the vertical contour detecting circuit 13. For example, the motionless region such as the characters "THL" is left in each image shown in FIG. 3 without any change by decreasing the threshold value. The region with small motion such as the right horizontal straight line in the image shown in FIG. 3 is left by slightly increasing the threshold value so as to lose partially the horizontal straight line. Regions with larger motion (not shown in FIG. 3) are hardly left by further increasing the threshold value. The reason is that the passband over which a signal passes through the differentiating circuit 15 and the vertical low-pass filter 16 shown in FIG. 1 is broadly selected because flicker becomes more noticeable in motionless regions such as characters.

FIG. 4 is a circuit system diagram showing an example of the vertical contour detecting circuit shown in FIG. 1. Since the binary circuit 12 digitizes an input signal, the vertical contour detecting circuit, as shown in FIG. 4, consists of logical circuits including exclusive OR circuits 43 and 44, an inverter 45, an AND circuit 46. The input section is formed of an 1H delay unit 41 (H represents a horizontal scanning period), and a one-pixel delay unit 42.

The operation of the vertical contour detecting circuit 13 will be described here. The binarization circuit 12 directly inputs an output digital signal to one input terminal of the two-input exclusive OR circuit 43 and to the 1H delay unit 41. The 1H delay unit 41 delays the digital signal by 1H and then inputs the resultant delayed digital signal to the other input terminal of the two-input exclusive OR circuit 43. Since the exclusive OR circuit 43 performs an exclusive OR (XOR) operation of a current input digital signal and a digital signal before one line, it outputs a low level signal when data values are the same in the vertical direction and outputs a high level signal when data values are different in the vertical direction. Hence, the output becomes a high level in a region where a signal value is different in the vertical direction, the outline can be detected in the vertical direction.

Similarly, the binarization circuit 12 directly inputs an output digital signal to one input terminal of the two-input exclusive OR circuit 44 and to the one pixel delay unit 42. The one pixel delay unit 42 delays the digital signal by one pixel transmission period and then inputs the resultant delayed digital signal to the other input terminal of the two-input exclusive OR circuit 44. Since the exclusive OR circuit 44 performs an exclusive OR (XOR) operation of a current digital signal and a digital signal before one pixel, it outputs a low level signal when two adjacent pixels in a horizontal direction have the same value and outputs a high level signal when two adjacent pixels in a horizontal direction have different values from each other. Hence, when two adjacent pixels have the same value in a horizontal direction, the horizontal straight line can be detected.

The inverter 45 inverts the polarity of the output signal from the exclusive OR circuit 44 and then supplies the inverted signal to the AND circuit 46. The AND circuit 46 performs a logical product operation of the output signal of the exclusive OR circuit 43 and the inverted signal. When the output signal of the AND circuit 46 is a high level, the horizontal straight line can be detected as an edge in a vertical direction. That is, since the active level of an output signal of the vertical contour detecting circuit 13 is in a high level, it can be judged that there is an outline when the output signal is in a high level and that there is no outline when the output signal is in a low level. In such an operation, when the input signal a corresponds to the image shown in FIG. 5(A), the vertical contour detecting circuit 13 produces the signal corresponding to the image represented in FIG. 5(B).

The delay unit 14 delays the output signal from horizontal straight line and vertical contour detecting circuit 13 by a larger one among the process time of the differentiating circuit 15 and the process time of the vertical low-pass filter 16, and then outputs the resultant to the switch 18.

Figure 13:
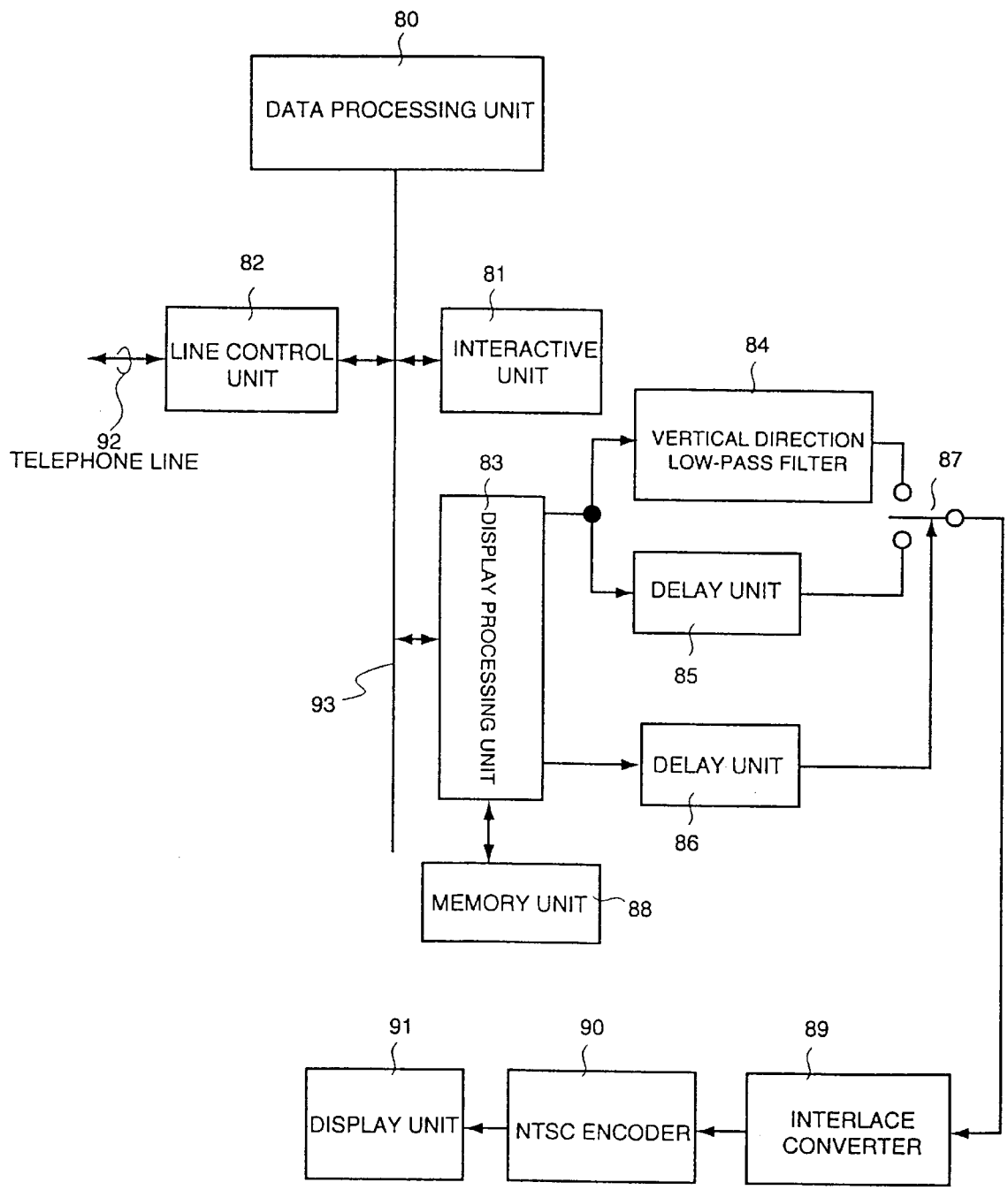
FIG. 13 is a block diagram illustrating a terminal having a conventional flicker reducing circuit.

FIG. 6 is a block diagram showing an example of the combination of the differentiating circuit 15 and the vertical low-pass filter 16. In FIG. 6, the upper portion represents the differentiating circuit 15 while the lower portion represents the vertical low-pass filter 16. Like the vertical low-pass filter 84 shown in FIG. 13, the vertical low-pass filter 16 is a filter that passes low-frequency components of less than a predetermined frequency among spatial frequency components in the vertical direction of an image. The vertical low-pass filter 16 can be formed of a transversal-type finite impulse response (FIR) filter with three taps or more (3, 5, 7, . . . ). Here, the vertical low-pass filter 16 is a three-tap FIP filter formed of a multiplier 52 which multiplies an input by a coefficient B1, a multiplier 55 which multiplies an input by a coefficient B2, a multiplier 58 which multiplies an input by a coefficient B3, 1H delay units 53 and 56, and an adder 61.

If the FIR filter is an ideal low-pass filter with finite taps which passes only frequency components of less than a predetermined frequency in a frequency region, without reducing the spectrum strength thereof, the flicker reducing circuit which can realize reduced flicker and no occurrence of blur can be configured. However, since the FIR filter has in actual only a limited number of taps, it is difficult to realize the ideal low-pass filter. For that reason, the reduction of flicker leads to a decrease in the strength of necessary signal components, whereby blurring occurs.

The differentiating circuit 15 is a circuit that detects an edge in the vertical direction by one-dimensionally differentiating in a vertical direction to correct blur, and multiplies the detected result by a coefficient. The differentiating circuit 15 is formed of a multiplier 51 that multiplies an input signal by a differential coefficient A1, a multiplier 54 that multiplies an input signal by a differential coefficient A2, a multiplier 57 that multiplies an input signal by a differential coefficient A3, 1H delay units 53 and 56, an adder 59, and a coefficient unit 60.

Referring to FIG. 6, the multiplier 51 multiplies the differential coefficient A1 by the signal output from the noise reducer 11 via the delay unit 14, and then supplies the result to the adder 59. The multiplier 52 multiplies the filter coefficient B1 by the signal output from the noise reducer 11 via the delay unit 14, and then supplies the result to the adder 61. The 1H delay unit 53 delays the signal output from the noise reducer 11 via the delay unit 14 by 1H, and then supplies the delayed signal to the multipliers 54 and 55. The 1H delay unit 56 further delays the signal from the delay unit 53 by 1H, and then supplies the 2H delayed signal to the multipliers 57 and 58. The multiplier 52 multiplies an input signal by the filter coefficient B1. The multiplier 55 multiplies the 1H delayed signal by the filter coefficient B2. The multiplier 58 multiplies the 2H delayed signal by the filter coefficient B3. The adder 61 adds three resultant products and inputs the sum as an output signal of the vertical low-pass filter 16.

The multiplier 51 multiplies an input signal by the differential coefficient A1. The multiplier 54 multiplies the 1H delayed signal by the differential coefficient A2. The multiplier 57 multiplies the 2H delayed signal by the differential coefficient A3. The adder 59 extracts a signal edge-detected through one-dimensional differentiation in a vertical direction by adding three resultant products and then outputs it to the coefficient unit 60. The coefficient unit 60 multiplies the edge-detected signal by a coefficient and then supplies the resultant output signal to the adder 17. The adder 17 adds the output signal to the output signal from the vertical low-pass filter 16 and then outputs the sum to the switch 18 shown in FIG. 1.

Figure 7:
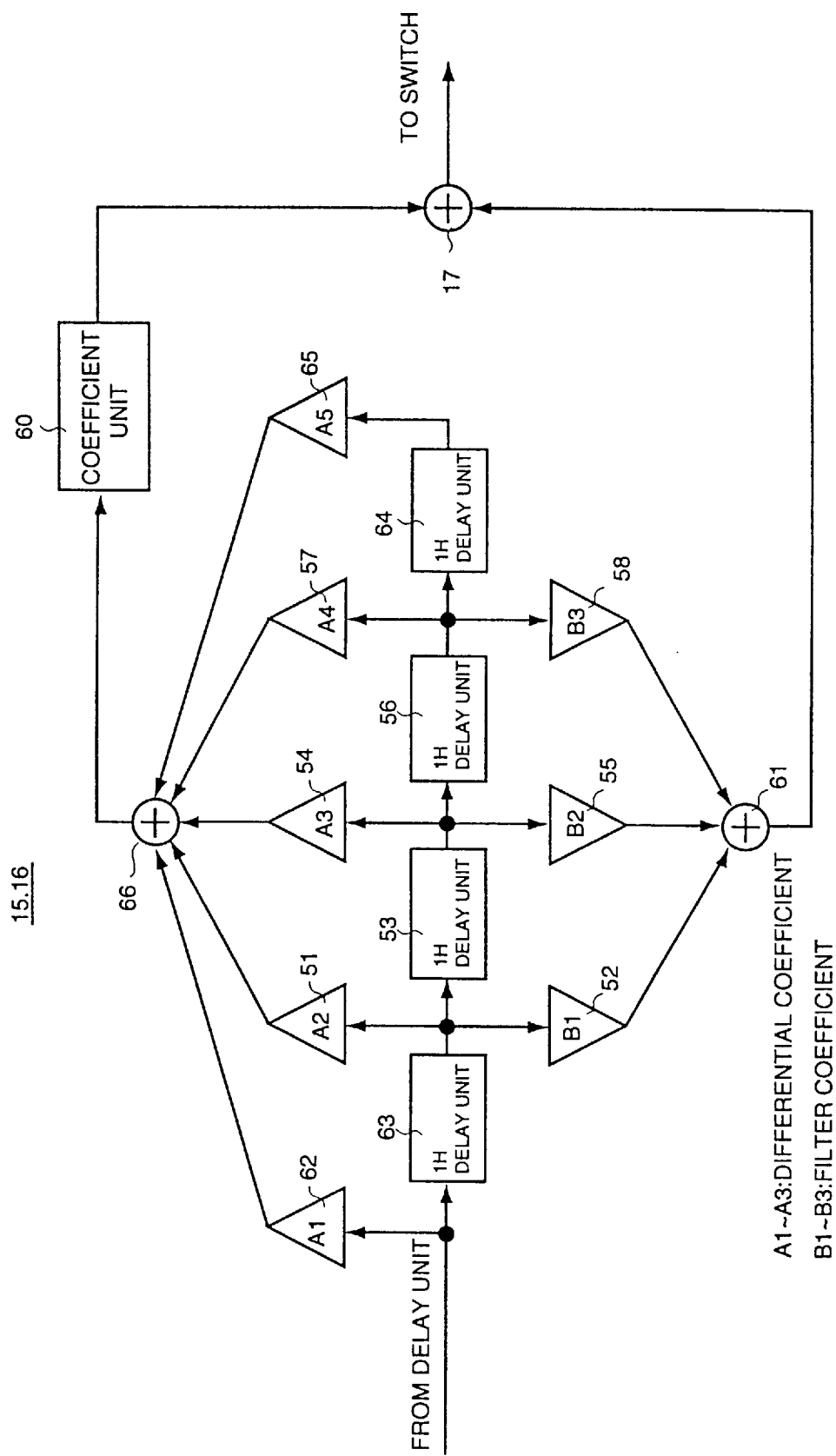
FIG. 7 is another block diagram showing another example of a combination of the differentiating circuit and the vertical low-pass filter in FIG. 1.

Instead of correcting the frequency with number of taps, the differentiating circuit can be configured as shown in FIG. 7 since it can adjust the spectrum strength of a frequency component corrected with a differential coefficient. In FIG. 7, like numerals are attached to the same elements as those in FIG. 6. Hence, duplicate explanation will be omitted here. The differentiating circuit 15 shown as the upper portion in FIG. 7 further includes a multiplier 62 and a 1H delay unit on the input side of the differentiating circuit shown in FIG. 6 and a 1H delay unit 64 and a multiplier 65 on the output thereof. The multiplier 62 multiplies the input signal by a differential coefficient A1. The multiplier 51 multiplies the 1H delayed signal by a differential coefficient A2. The multiplier 54 multiplies the 2H delayed signal by a differential coefficient A3. The multiplier 57 multiplies the 3H delayed signal by a differential coefficient A4. The multiplier 65 multiplies the 4H delayed signal by a differential coefficient A5. The adder 66 adds the five products and then supplies the sum to the coefficient unit 60.

FIG. 8(A) shows an image corresponding to the signal input to the differentiating circuit 15 and the vertical low-pass filter 16. The image corresponding to the output signal from the differentiating circuit 15 is shown in FIG. 8(B). The cross sectional view taken along the line A—A (corresponding to signal level changes in the vertical direction) is shown in FIG. 8(C).

FIG. 9 is a block diagram showing an example of the delay unit 14 shown in FIG. 1. The delay unit 14 is formed of delay circuits 71 and 72. The delay unit has a first route, a second route and a third route. The first route directly outputs the output display signal a from the noise reducer 11 to the differentiating circuit 15 and the vertical low-pass filter 16, without any delay. In the second route, the delay circuit 71 delays the output display signal a from the noise reducer 11 by a larger one among the process time of the differentiating circuit 15 and the process time of the vertical low-pass filter 16 and then outputs the delayed signal to the switch 18. In the third route, the delay circuit 72 delays the output data from the vertical contour detecting circuit 13 by a larger one among the process time of the differentiating circuit 15 and the process time of the vertical low-pass filter 16 and then outputs the delayed signal to the switch 18.

In the configuration shown in FIG. 6, the differentiating circuit 15 has a delay time of 1H and the vertical low-pass filter 16 has a delay time of 1H. In FIG. 9, the differentiating circuit 71 has a delay time of 1H and the vertical low-pass filter 72 has a delay time of 1H. On the other hand, when each of the differentiating circuit 15 and the vertical low-pass filter 16 forms the configuration shown in FIG. 7, the differentiating circuit 15 has a process time of 2H and the vertical low-pass filter 16 has a process time of 2H. Hence, the delay time of each of the delay circuits 71 and 72 is set to 2H.

In FIG. 1, the delay circuit 72 within the delay unit 14 delays the output data from the horizontal straight line and vertical contour detecting circuit 13 by a larger one among the process time of the differentiating circuit 15 and the process time of the vertical low-pass filter 16, whereby flag data can be obtained.

While a flag is being set based on the flag data, the switch 18 selects a signal from the adder 17 which adds the output signal of the differentiating circuit 15 to the output signal of the vertical low-pass filter 16. While a flag is not being set, the switch 18 also selects a display signal a obtained by delaying the output data by a larger one among the process time of the differentiating circuit 15 and the process time of the vertical low-pass filter 16 by means of the delay circuit 71 within the delay unit 14.

That is, the switch 18 selects the signal from the adder 17 during the flag setting period corresponding to a region requiring flicker reduction. For a region requiring no flicker reduction, the switch 18 selects the display signal a which is delayed by the delay unit 14 and is not subjected to the differential process and the vertical low-pass filtering process.

According to the flicker reducing circuit 10 according to the present embodiment, the vertical contour detecting circuit 13 detects horizontal straight lines on the display screen at any character display position. A region with less motion such as a character between a previous frame and the following frame is subjected to a broad vertical low-pass filtering process. The horizontal straight line in the graphic data with large motion is subjected a narrow vertical low-pass filtering process. Thus, a degradation of image is minimized while flicker is reduced. In the vertical low-pass filtering process, the differentiating circuit 15 performs a broad differentiation to the blurred outline of a horizontal straight line in a region with less motion such as a character between a previous frame and the following frame, and performs a narrow differentiation to a region horizontal straight line with large motion in graphic data. The signal thus obtained is added to the output signal from the vertical low-pass filter 16. Thus, the blur is corrected while the flicker is reduced. As a result, degradation of an image can be prevented.

Figure 10:
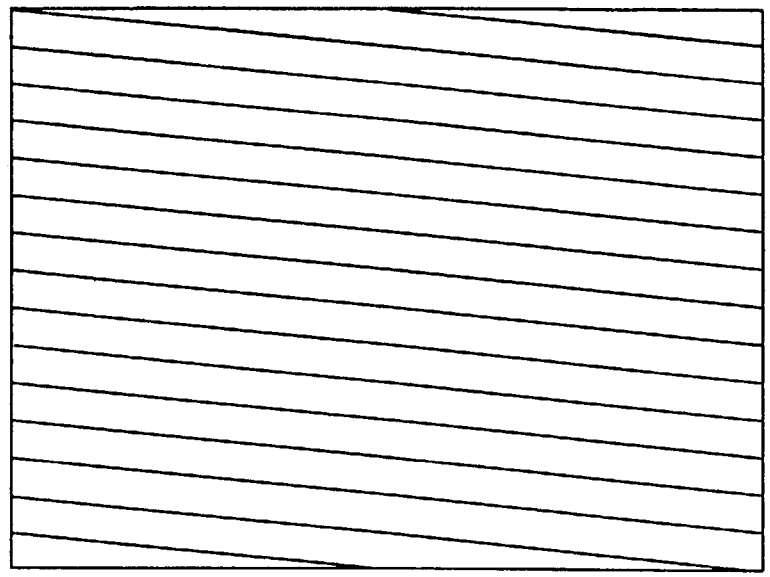
FIG. 10 is an explanatory diagram for an interlace display system.
Figure 11:
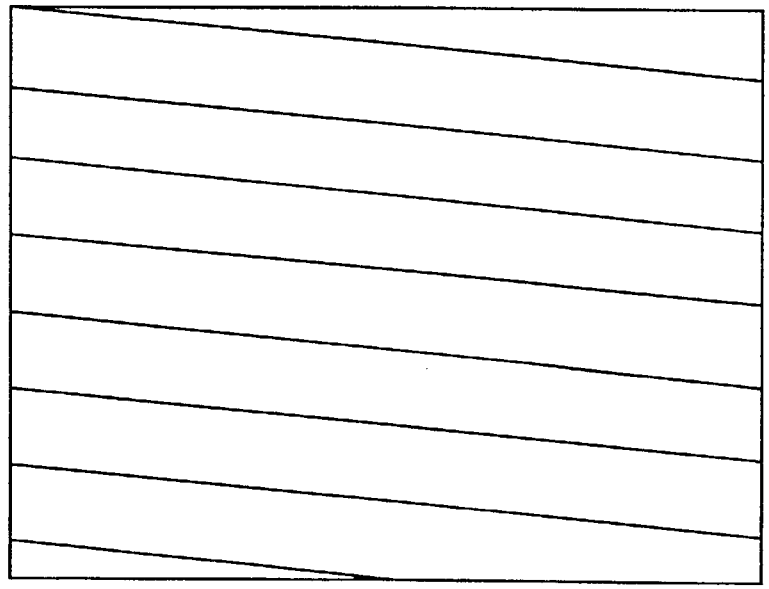
FIG. 11 is a diagram showing a first field scanning operation in a 2:1 interlace display system.
Figure 12:
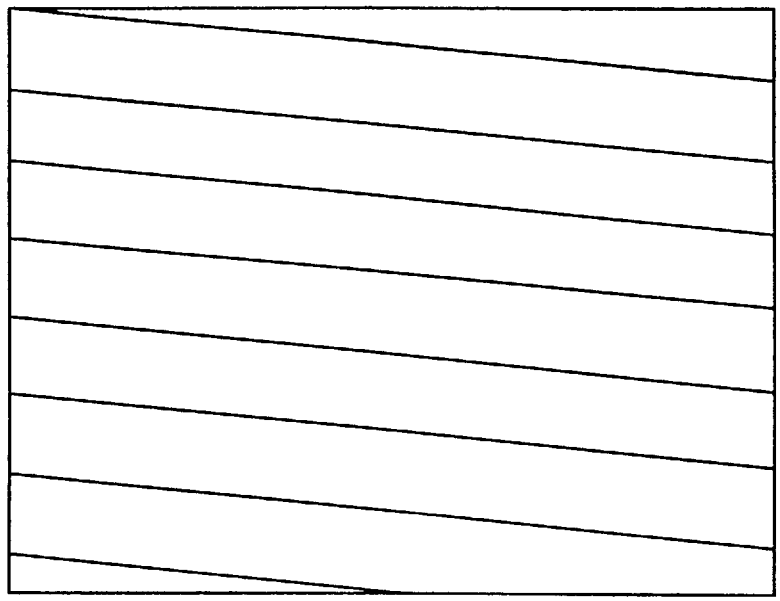
FIG. 12 is a diagram showing a second field scanning operation in a 2:1 interlace display system.

The image signal output from the switch 18 is displayed in a non-interlace display system as shown in FIG. 10. Since the TV monitor 23 uses the 2:1 interlace display system which alternately repeats the first filed scanning shown in FIG. 11 and the second field scanning shown in FIG. 12, the interlace converter 21 converts the image signal into data in the 2:1 interlace display system.

The interlace converter 21 supplies an image signal as a component signal to the NTSC encoder 22. The NTSC encoder 22 creates a color signal and a baseband bright signal from the image signal. The NTSC encoder 22 also performs a balanced modulation of the color signal and then band-shared-multiplexes the modulated signal to the high-frequency region of the bright signal, thus converting the multiplexed signal into an NTSC system video signal. Then NTSC encoder 22 supplies the converted signal to the TV monitor 23 to display on the screen.

In the flicker noticeable region of an image to be displayed with the flicker reducing circuit, high-frequency components of a spatial frequency in a vertical direction is removed through the differentiating circuit 15 and the vertical low-pass filter 16 to remove blur occurring therein. Thus, the flicker can be reduced with less blur. In no flicker occurring regions, data is output without performing the blur correcting process. Moreover, a flicker noticeable region is stepwise separated into a particular flicker noticeable region such as a character with no motion and a flicker slightly noticeable region such as a horizontal line in image data. Regions close to the particular flicker noticeable region is broadly subjected to the differentiating circuit 15 and the vertical low pass filter 16. Regions close to the flicker slightly noticeable region is narrowly subjected to the differentiating circuit 15 and the vertical low pass filter 16. Hence, the image can be improved better than the conventional image. Since two flicker noticeable regions are separated based on only image data to be input, it is not needed to input two kinds of data including character data and composite data in which character data and graphic data are superposed, as performed in the prior art. Hence, the present invention can be used for general purposes, in comparison with the prior art.

The flicker reducing circuit according to the present invention should not be limited only to the embodiments. For example, after image data is encoded into a television system in other 2:1 interlace display system such as a PAL system, the resultant data may be displayed on a suitable display unit.

As described above, according to the present invention, the vertical contour detecting circuit detects an outline of the vertical component of a horizontal straight line. Under control of the flag data, the switch selects a signal being the sum of low-frequency components of a spatial frequency in a vertical direction output from the filter means and the output signal from the differentiating circuit for a period during which it is judged that an outline corresponds to the vertical component of a horizontal straight line, and selects a delay display signal output from the delay unit, but not processed in the filter means, for a period during which it is judged that the outline does not correspond to the vertical component of a horizontal straight line. As a result, a display signal can be output in which the filter means performs flicker reduction and blur correction to not only a character display position but also a flicker noticeable region such as a horizontal straight line in graphic data. In comparison with the prior art, degradation of an image can be reduced as less as possible while flicker can be reduced over a broader range.

Furthermore, according to the present invention, the vertical contour detecting circuit detects an outline of the vertical component of a horizontal straight line with a digital signal obtained by dynamically changing the threshold value of the binarization circuit with a motion detection signal. Thus, a great number of flags are set to select a signal from the filter means broadly in a particular flicker noticeable region in a horizontal straight line, or a motionless region such as a character between a previous frame and the following frame. A small number of flags are set to select a signal from the filter means in a region where a flicker is not so noticeable in a horizontal straight line, or a region with small motion such as a horizontal straight line in, for example, graphic data or a nature image between a previous frame and the following frame. As a result, it can be prevented that an image is degraded by outputting the output from the filter means to a flicker actually-generating region which is not very noticeable to the degree more than required. Good images with less flicker and less blur can be displayed, compared with images in the prior art.

According to the present invention, since a flicker noticeable region is stepwise separated from a flicker slightly-noticeable region based on only an input display signal, it is not needed to input two kinds of data including character data and composite data in which character data and graphic data are superimposed. Hence, the flicker reducing circuit can be used for general purposes.

The entire disclosure of Japanese Patent Application No. 8-280630 filed on Oct. 23, 1996 including specification, claims, drawing and summary are incorporated herein by reference in its entirety.

What is claimed is:

1. A flicker reducing circuit comprising:
    a noise reducer for reducing noises included in a display signal by detecting motion between a previous frame and the following frame, and for outputting a motion detection signal,
    a binarization circuit for dynamically varying its threshold value based on said motion detection signal output from said noise reducer and then digitizing and outputting an output display signal from said noise reducer,
    a vertical contour detecting circuit for detecting an outline of the vertical component of a horizontal straight line from an output digital signal of said binarization circuit, and outputting the outline as flag data,
    filter means for passing a low-frequency component of a spatial frequency in a vertical direction on an screen of said output display signal output from said noise reducer, and outputting a signal obtained by adding said display signal to a signal component to be originally included,
    a delay unit for delaying a display signal output from said noise reducer by a process time of said filter means and delaying said flag data output from said vertical contour detecting circuit by said process time, and then outputting said display signal and said flag data, and
    a switch for selecting said output signal from said filter means for a period during which it is judged that an outline corresponds to a vertical component of a horizontal straight line according to said flag data from said delay unit and selecting said delay display signal output from said delay unit for a period during which it is judged that an outline does not correspond to a vertical component of a horizontal straight line according to said flag data from said delay unit.

2. The flicker reducing circuit of claim 1, wherein said noise reducer separates an area into plural steps according to a motion rate of said input display signal between said previous frame and said following frame, multiplies a differential signal between said previous frame and said following frame by a coefficient which is set to a larger value to a slower moving area, and outputting a signal obtained by subtracting said multiplication result from said input display signal.

3. The flicker reducing circuit of claim 1, wherein said binarization circuit receives as input signals said output display signal and said motion detection signal output from said noise reducer, and dynamically varies said threshold value so as to set a slower moving area to a smaller value, according to said motion detection signal, and compares said display signal with said threshold value, and then digitizes and outputs the compared result.

4. The flicker reducing circuit of claim 1, wherein said vertical contour detecting circuit comprises:
    a first detecting circuit for detecting an outline in a vertical direction from the digital signal of said binary circuit,
    a second detecting circuit for detecting a horizontal straight line, and
    a logical circuit for performing a logical product of the output detection signal from said first detecting circuit and the output detection signal from said second detecting circuit and then outputting a detection signal corresponding to an outline portion of a vertical component in a vertical direction of said horizontal straight line.

5. The flicker reducing circuit of claim 1, wherein said filter means comprises:
    a differentiating circuit for detecting an edge in a vertical direction by performing one-directional differential operation in a vertical direction and multiplying the result by a coefficient, thus outputting the product,
    a transversal vertical low-pass filter with at least three taps for passing a low-frequency component of less than a predetermined frequency among spatial frequency components in a vertical direction on a screen of said display signal, and
    an adder for adding an output signal of said differentiating circuit to an output signal of said vertical low-pass filter, and then outputting the sum.

6. The flicker reducing circuit of claim 1, wherein said input display signal is a component signal, and wherein said output signal of said switch is converted into a composite image signal conformed to a desired standard system image signal in an interlace display system.

7. A flicker reducing method comprising the steps of:
    reducing noises included in a display signal by detecting motion between a previous frame and the following frame, and outputting a motion detection signal,
    dynamically varying its threshold value based on said motion detection signal output and then digitizing and outputting an output display signal,
    detecting an outline of the vertical component of a horizontal straight line from an output digital signal and outputting the outline as flag data, passing a low-frequency component of a spatial frequency in a vertical direction on an screen of said output display signal, and outputting a signal obtained by adding said display signal to a signal component to be originally included, delaying an output display signal by a process time and delaying said flag data by said process time, and then outputting said output display signal and said output flag data, and selecting an output signal for a period during which it is judged that an outline corresponds to a vertical component of a horizontal straight line according to said flag data and selecting said delay display signal for a period during which it is judged that an outline does not correspond to a vertical component of a horizontal straight line according to said flag data.

* * * * *